United States Patent [19]

Humphrey

[11] 4,134,786

[45] Jan. 16, 1979

[54] PROCESS FOR PURIFICATION OF WASTE WATER PRODUCED BY A KRAFT PROCESS PULP AND PAPER MILL

[76] Inventors: James C. Fletcher, Administrator of the National Aeronautics and Space Administration, with respect to an invention of Marshall F. Humphrey, Duarte, Calif.

[21] Appl. No.: 750,798

[22] Filed: Dec. 15, 1976

[51] Int. Cl.² .......................................... D21C 11/00
[52] U.S. Cl. .................................... 162/14; 162/29; 210/28; 210/40; 210/45; 210/54; 210/66; 210/67; 210/70; 210/73 R
[58] Field of Search .............. 162/14, 16, 29; 210/28, 210/40, 43, 45, 54 R, 66, 67, 70, 73 R; 260/124 R

[56] References Cited

U.S. PATENT DOCUMENTS

| 2,850,492 | 9/1958 | Erskine et al. ................... 260/124 |
| 4,008,161 | 2/1977 | Wong et al. ....................... 162/29 |

FOREIGN PATENT DOCUMENTS 589807  12/1959  Canada ........................... 162/DIG. 8

Primary Examiner—Richard V. Fisher
Assistant Examiner—William F. Smith
Attorney, Agent, or Firm—Monte F. Mott; John R. Manning; Wilfred Grifka

[57] ABSTRACT

A method and means for purifying the waste water from paper and pulp mill wastes obtained from a mill using the Kraft process by first precipitating lignins and lignin derivatives from the waste stream with quaternary ammonium compounds, removing other impurities by activated carbon produced from the cellulosic components of the water, and thereafter separating water from the precipitate and solids. The activated carbon also acts as an aid to the separation of the water and solids. If recovery of lignins is also desired, then the precipitate containing the lignins and quaternary ammonium compound is dissolved in methanol. Upon acidification, the lignin is precipitated from the solution. The methanol and quaternary ammonium compound are recovered for reuse from the remainder.

11 Claims, 1 Drawing Figure

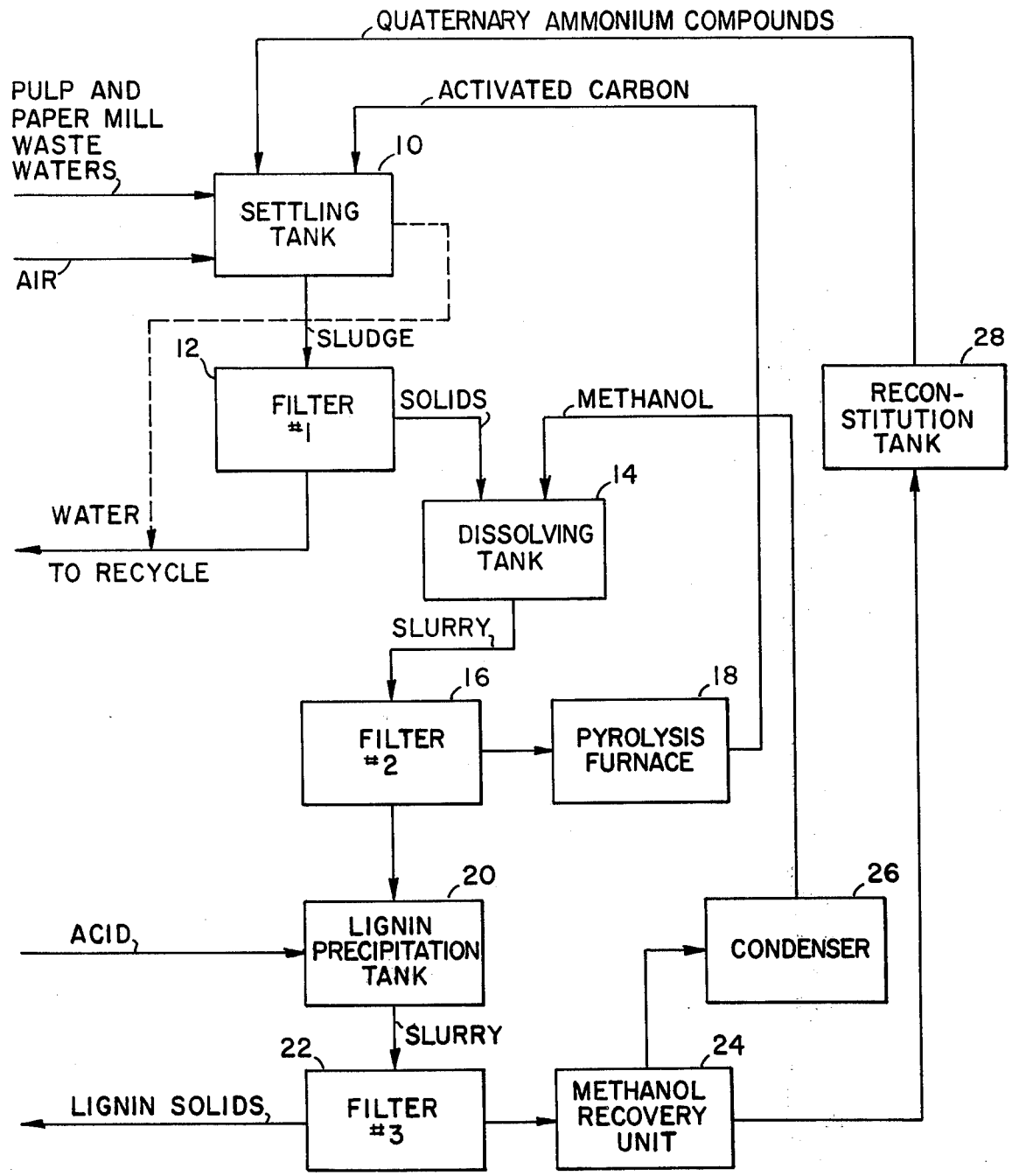

PROCESS FOR PURIFICATION OF WASTE WATER PRODUCED BY A KRAFT PROCESS PULP AND PAPER MILL

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a method and means for purifying the waste water present in Kraft pulp and paper mill wastes.

In the process of pulp and paper manufacture, a considerable amount of water is used. When this water is discharged, it carries varying degrees of pollution since only about 34% of it receives some form of treatment to remove the pollution. Treatment of pulp and paper waste is difficult and complicated because of the large quantities of water used by the mills which require large installations to remove small amounts of pollutants per unit volume. For example, a normal Kraft process mill will use 35,000 gallons of water per ton of pulp produced and a sulphite mill will use 63,000 gallons per ton. Also, many different waste streams originate in the plant. These streams vary in concentration and composition and with the type of processing. Since all of the waste streams require treatment, it becomes an economic puzzle whether to combine the wastes and treat them together or to treat them separately as they are being generated. For some of the waste materials, there is no known efficient method for treatment. The wastes which are in the waste streams are complex and numerous and each of them contributes different degrees of resistance to treatment and degradation in the waste treatment effort. Some materials can be removed or digested by biological systems. Others are toxic and very stable to most biological organisms. The color components that are produced by the lignins are very stable and cannot be removed by normal biological digestion processes.

Lignins and their colored degradation products can be precipitated by massive amounts of calcium salts, (such as lime), but this treatment does not remove the biochemical oxygen demand, (BOD), causing materials. Activated carbons, when used in excessively large amounts and in combination with lime may be effective in removing color and BOD. However, the method has economic limitations.

Past studies have shown that no single method is known that will treat the combined mill pulp and paper wastes. None of the present treatment procedures addresses the problem of the generated solids' disposal. All of the state of the art treatment efforts are aimed at the two major problems which are the economic reduction of BOD and the elimination of color. However, except for the lime treatment no other method for color removal has received serious consideration in the industry.

While the color problem alone has not been shown to be detrimental to the environment, as it does not consume oxygen from the receiving stream, it is objectionable because it can be seen. There is little data available on the effect on marine environment when exposed to bodies of water containing highly colored waste.

Industry is also searching for an inexpensive method to separate and recover the lignin materials. Lignins are useful since they can be competitive with petro chemicals as a source of chemical raw materials. This is especially true since lignin is a replenishable resource and therefore it may become an essential source for organic chemicals, plastics and combustible gases.

OBJECTS AND SUMMARY OF THE INVENTION

It is an object of this invention to provide useful method and means for purifying the water present in pulp and paper mill wastes obtained from a Kraft process mill.

It is another object of this invention to provide a relatively inexpensive method and means for purifying the water present in the waste of a paper mill using the Kraft process.

Still another object of the invention is to provide a novel and useful paper mill waste treatment system in which the waste water is purified for reuse and lignins are extracted.

The foregoing and other objects of the invention are achieved in an arrangement wherein Kraft pulp and paper mill waste waters are dumped into a settling tank and mixed there with activated carbon and quaternary ammonium compounds. The lignin-ammonium complex, together with other settleable materials are permitted to settle and form a sludge at the bottom of the settling tank. The supernatant fluid will be clean and recyclable water. The sludge is passed through a filter or other suitable equipment to separate the solids from the water. This water is also clean and recyclable.

To extract lignins and also to obtain activated carbon the solids are dissolved in methanol producing a slurry. The methanol dissolves the lignin and quaternary ammonium compound, but not the carbon or cellulosic solids. The slurry is then passed through a filter. The carbon and cellulosic solids remaining after the filtration step are pyrolyzed to produce activated carbon which can be returned to the settling tank. The liquid passing through the filter is treated with mineral acid which precipitates out the lignin. The precipitated lignin is then separated from the remainder of the solution by filtration. The remainder of the solution is passed through a distillation column whereby most of the methanol is stripped and recovered and can be used again. The remainder after the distillation is a mixture of the quaternary ammonium compounds and the mineral acid. The quaternary ammonium salt mixture is neutralized with caustic in the reconstitution tank to a pH of 5 to 8 diluted with water to a concentration of 1% quaternay ammonium compound salt, and returned into the settling tank for use again.

The novel features of the invention are set forth with particularity in the appended claims. The invention will best be understood from the following description when read in conjunction with the accompanying drawing.

DESCRIPTION OF THE PREFERRED EMBODIMENTS

In converting raw material, such as wood, into pulp, which is done in making paper, large quantities of high quality water are used which become contaminated with many materials along with lignins, a basic ingredient of wood. It has been customary to discharge the contaminated water into a nearby body of water or stream, because there is no economically feasible method of completely removing the lignins and other contaminants. This effluent degrades the body of water into which it is discharged in two ways. The lignins are highly colored, so that they discolor the water, which is objectionable aesthetically and of unknown hazard to marine life. Further, the lignin degradation products and other contaminants compete with living organisms in the water for the available oxygen.

In accordance with this invention quaternary ammonium compounds are used to precipitate the lignins and colored lignin degredation products and activated carbon is used to adsorb other contaminants whereby purified and reusable water is obtained.

A quaternary ammonium compound can be represented as follows:

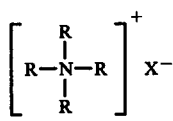

The R's can be carbon chains with appropriate attendant hydrogen atoms or simply methyl groups or hydrogen atoms. The anion $[X^-]$ group can be hydroxyl, phosphate, acetate, sulphate, chloride, etc. The N is a Nitrogen atom.

The class of quaternary ammonium compounds of interest here are water miscible. They contain one, two or three methyl ($CH_3$) groups and at least one alkyl group containing 8 to 18 carbon atoms. Such compounds include:

Mono methyl trialkyl ammonium acetate
Dimethyl distearyl ammonium phosphate, and
Trimethyl cetyl ammonium chloride.

Laboratory tests verify that certain compounds of this class precipitate lignins and colored lignin degradation products from a large variety of aqueous wastes (prior art teaches that amines can be used to extract color impurities but only in a complex multi-phased solvent system).

Additional tests indicate certain alkyl propylene diamines also function in this manner. The quaternary ammonium compound is added to the lignin containing water on the basis of substantially one weight equivalent of quaternary ammonium compound to one weight equivalent of lignin. The basis of the weight determination is done either as a result of a chemical analysis of the waste water or by a spectrophotometric analysis, whereby the concentration of the lignin is determined as well as the amount of the quaternary ammonium compound which is to be added. This is described more fully below.

Referring now to the drawing, there is shown a schematic diagram for treating pulp and paper mill waste waters obtained from a Kraft process paper mill in accordance with this invention.

The pulp and paper mill waste waters are deposited in a settling tank 10, into which air may be introduced, if desired. Quaternary ammonium compounds together with activated carbon are added to the settling tank and mixed with the waste water.

The amount of activated carbon to be added is determined by running a test on a sample of the waste water to determine the chemical oxygen demand (COD) milligrams per liter. A weight of activated carbon of between 2 to 5 times the COD milligrams/liter is then added to the settling tank.

The mixture is agitated and allowed to stand for a period of time until sludge settles to the bottom of the settling tank. This sludge will be comprised of lignins and lignin waste products combined with the quaternary ammonium compound, cellulosic wastes and with the activated carbon which was added to absorb soluble impurities and clarify the water. The supernatant water may be removed from the settling tank since, as a result of the treatment given, it should be ready for recycling, (or disposal as clean water).

One percent solution of quaternary ammonium salt is added to the lignin containing waste liquor on the basis of color as follows:

A sample of the waste is taken (100 ml) and 1 ml of a 1% solution in water of quaternary ammonium compound salt added. The color is compared to the original with a spectrophotometer at a wave length of 450$\mu$ (pH 7.6). Additional quaternary ammonium salt is added until the color is lowered the proper amount (i.e., substantially colorless). The total amount of quaternary ammonium salt added is determined and calculated as the amount per 1000 gallons. This would then be added to a known quantity of waste liquor, agitated and the color examined again with the spectrophotometer, if more quaternary ammonium is needed it can then be added.

If it is further desired to recover the lignins from the sludge, and also to obtain activated carbon for use in the water purification process, then the sludge on the bottom of the settling tank is applied to a first filter 12 to separate the solid matter from the water. The water is clean water and can also be recycled or disposed of. The solid material or cake is transferred to a dissolving tank 14. Into the dissolving tank 14 there is introduced methanol sufficient to dissolve the quaternary ammonium compounds of lignin. It has been determined that quaternary ammonium compounds of lignins are soluble in a neutral solution of methanol. The minimum methanol concentration should equal the water concentration in the cake. That is the minimum concentration of methanol and is most cost effective. Another quantitive measure can be to add methanol until the slurry turns a dark brown in color which is the lignin color. The solids and added methanol form a slurry which is applied to a second filter 16. The second filter separates the solid undissolved matter from the solution of methanol and quaternary ammonium lignins. The solid matter is transferred to a pyrolysis furnace 18, where it is pyrolized and produces activated carbon. The activated carbon from the pyrolysis furnace may then be fed back to the settling tank to treat a new batch of waste water.

The solution which passes through the filter 16 is applied to a lignin precipitation tank 20. It has been found that when a solution of methanol is acidified, quaternary ammonium compounds remain soluble therein, but lignins are insoluble therein. Accordingly, a mineral acid such as sulphuric, or hydrochloric, or phosphoric acid, is added to the solution in the lignin precipitation tank to adjust its pH to 2 to 2.5. As a result the solution in the lignin precipitation tank forms a slurry.

The slurry is applied to a third filter 22. The third filter separates the solid material, comprising lignin solids from the quaternary ammonium compound salt and acidified methanol mixture. The lignin solids are thus recovered.

The mixture of methanol and quaternary ammonium compounds is applied to a methanol recovery unit 24, which comprises a distillation column. The distillate is methanol, which is condensed in a condenser and the methanol output is fed back to the dissolving tank 14. The residual comprises quaternary ammonium compound salts. This is transferred to a reconstitution tank 28. The reconstitution tank is used to adjust the concentration and the pH, between 5.0 to 8.0, of the quaternary ammonium compound salt. The concentration remaining from the methanol unit is approximately 10 to 15%. This must be diluted with water to approximately 1% solution for pumpability and to keep the quaternary ammonium salt dissolved. The reconstituted quaternary ammonium compound can then be again introduced into the settling tank 10.

Efficacy of the new process, compared to treatment methods in the prior art can be compared as follows:

|  | Approximate Dosage (lb/1000 gal) | Percent Lignins and Color Removed |
|---|---|---|
| Lime Treatment | 12.5 | 70 |
| Lime (4#) + Carbon (2.5#) | 6.5 | 90 |
| Bio-oxidation + Carbon | 10.5 | 92 |
| Carbon Alone | 42 to 168 | 95+ |
| Quaternary Ammonium Compound | 3 | 100 |

The foregoing shows the efficacy of the process in accordance with this invention when compared with the treatment methods of the prior art.

There has accordingly been shown and described herein a novel, useful and economical method and means for treating pulp and paper mill wastes, whereby the large quantities of polluted water resulting may be purified for reuse, and also lignins and activated carbon may be recovered.

I claim:

1. A method of treating waste water containing in the water chemical oxygen demand (COD) matter including at least lignin, the steps comprising:

mixing one of the water miscible, organic quaternary ammonium compounds selected from a group consisting of mono methyl trialkyl ammonium acetate, dimethyl distearyl ammonium phosphate and trimethyl cetyl ammonium chloride with said waste water substantially on the basis of one weight equivalent of quaternary ammonium compound to one weight equivalent of lignin contained in said waste water, to form lignin-quaternary ammonium compounds which are insoluble in the water;

mixing two to five times as much activated carbon with said waste water and the matter contained therein as the weight per unit volume of the chemical oxygen demand (COD) matter in said waste water, to adsorb at least insoluble matter in said water, including said lignin-quaternary ammonium compounds, allowing said mixture of the waste water, the lignin-quaternary ammonium compounds which are insoluble in the water and the activated carbon to stand until settleable matter, including the water insoluble lignin-quaternary ammonium compounds and the activated carbon in said waste water settled as a sludge and there is supernatant water above said sludge, separating said supernatant water from the sludge, and extracting from said sludge the lignin from the lignin-quaternary ammonium compounds contained therein.

2. The method as recited in claim 1 wherein the step of extracting lignin includes the steps of:

adding a liquid to the solid matter in said sludge to form a slurry, in which the lignin-ammonium compounds are dissolved in said liquid, filtering said slurry to separate the liquid with the lignin-quaternary ammonium compounds dissolved therein from solid matter, adding matter to said liquid to cause the lignin in said lignin-quaternary ammonium compounds to become separated from the quaternary ammonium compounds, with the lignin becoming insoluble in the liquid with said matter, and separating said insoluble lignin from said liquid and the matter.

3. The method as recited in claim 2 wherein there are included the steps of:

filtering said sludge to separate the solid matter in said sludge from the water therein, and pyrolyzing the solid matter from said slurry to produce activated carbon.

4. The method as recited in claim 1 wherein the step of extracting includes the steps of:

adding methanol to the sludge from which said water was separated to form a slurry with said lignin-quaternary ammonium compounds dissolved in the liquor of said slurry;

separating the liquor from the solid matter of said slurry;

adding an acid to said liquor to dissolve the quaternary ammonium compound in the lignin-quaternary ammonium compounds in said liquor with the lignin being undissolved in the liquor to which said acid was added to form a second slurry in which the lignin is solid matter, and filtering said second slurry to separate the lignin solid matter from the remaining liquor.

5. The method as recited in claim 4 wherein there is included the steps of:

distilling said remaining liquor of said second slurry to separate the methanol from the liquor remaining after distillation, which liquor contains quaternary ammonium compound salts, and extracting from the liquor containing said quaternary ammonium compound salts quaternary ammonium compounds.

6. A method of purifying pulp and paper mill waste water obtained from a Kraft process mill, such waste water containing chemical oxygen demand (COD) matter including at least lignin, the steps comprising:

mixing with said waste water one of the water miscible organic quaternary ammonium compounds selected from a group consisting of mono methyl trialkyl ammonium acetate, dimethyl distearyl ammonium phosphate, and trimethyl cetyl ammonium chloride, to form lignin-quaternary ammonium compounds until said waste water is substantially colorless, mixing between two to five times as much activated carbon by weight with said waste water as the weight of the COD content of said waste water per unit volume, allowing said mixture of waste water, the lignin-quaternary ammonium compounds and activated carbon to stand until settleable matter including said activated carbon and the lignin-quaternary ammonium compounds in said waste water settled as a sludge containing solid matter and there is supernatant water above said sludge, separating said supernatant water from said sludge, adding a dissolving liquid to said solid matter of said sludge to form a slurry, in which the lignin-quaternary ammonium compounds are dissolved in the slurry liquor, filtering said slurry to separate liquor thereof from its solid matter, and extracting lignins from said liquor.

7. A method as recited in claim 6 including the steps of:

pyrolyzing said solid matter of said sludge to form activated carbon.

8. A method as recited in claim 6 wherein said step of extracting lignins from said liquor includes:

acidifying said liquor to decompose said lignin-quaternary ammonium compounds in said liquor to precipitate a second slurry, containing lignins as solid matter, and filtering said second slurry to separate the solid matter comprising lignins from the remaining liquor which contains at least quaternary ammonium compounds.

9. A method as recited in claim 8 including the step of separating the quaternary ammonium compound from from the liquor of said second slurry after the separation of the solid matter therefrom.

10. A method of purifying pulp and paper mill waste water obtained from a Kraft process paper mill said waste water containing chemical oxygen demand (COD) matter including at least lignin and extracting the lignins in said waste water, the steps comprising:

mixing one of the water miscible, organic quaternary ammonium compounds selected from a group consisting of mono methyl trialkyl ammonium acetate, dimethyl distearyl ammonium phosphate and trimethyl cetyl ammonium chloride with said waste water substantially on the basis of one weight equivalent of quaternary ammonium compounds to one weight equivalent of lignin contained in said waste water, to form water immiscible lignin-quaternary ammonium products, mixing two to five times as much activated carbon with said waste water as the weight per unit volume of the COD content of said waste water, allowing said mixture of waste water, lignin-quaternary ammonium compounds and activated carbon to stand until settleable matter including said lignin-quaternary ammonium compounds in said waste water has been adsorbed by said activated carbon and has settled as a sludge and there is supernatant water above said sludge, separating said supernatant water from the sludge, filtering said sludge to separate the solid matter in said sludge from the water therein, adding methanol to said solid matter to form a slurry, comprising a liquid and solid material, with said lignin-quaternary ammonium compounds dissolved in said liquid, separating the solid material in said slurry from the liquid, acidifying said liquid containing said lignin-quaternary ammonium compounds to a pH from 2 to 2.5 whereby a second slurry is formed, in which said lignins form at least part of the solid matter, and separating said solid matter including the lignins from the liquid portion of said second slurry.

11. A method as recited in claim 10 wherein there is included the step of:

extracting from the liquid of said second slurry remaining after removal of the solid matter including the lignins methanol and quaternary ammonium compounds contained in said liquid of said second slurry.

* * * * *